United States Patent [19]

Lemaire et al.

[11] Patent Number: 4,594,266

[45] Date of Patent: Jun. 10, 1986

[54] PROCESS AND AN APPARATUS FOR BAKING AN ORGANIC COATING WHICH HAS BEEN APPLIED TO A SUBSTRATE

[75] Inventors: Jean-Paul E. Lemaire, Neuville en Condroz; Lucien P. Renard, Seraing, both of Belgium

[73] Assignee: Cockerill Sambre S.A., Seraing, Belgium

[21] Appl. No.: 629,866

[22] Filed: Jul. 11, 1984

[30] Foreign Application Priority Data

Jul. 14, 1983 [LU] Luxembourg ............................ 84911

[51] Int. Cl.⁴ .......................... B05D 3/06; C23C 14/00; B05B 5/00; F26B 3/32
[52] U.S. Cl. .......................................... 427/55; 34/41; 34/242; 118/50.1; 118/642; 118/643; 427/294; 427/295
[58] Field of Search ...................... 118/50.1, 642, 643; 427/55, 294–298; 34/41, 242

[56] References Cited

U.S. PATENT DOCUMENTS

| | | | |
|---|---|---|---|
| 2,820,131 | 1/1958 | Kodama | 219/34 |
| 4,118,873 | 10/1978 | Rothchild | 34/41 X |
| 4,143,468 | 3/1979 | Novotny et al. | 34/41 X |
| 4,336,279 | 6/1982 | Metzger | 427/55 |
| 4,508,750 | 4/1985 | Fell et al. | 427/294 X |

Primary Examiner—Michael R. Lusignan
Attorney, Agent, or Firm—Sughrue, Mion, Zinn, Macpeak & Seas

[57] ABSTRACT

This invention provides a process and an apparatus for baking an organic coating which has been applied to a substrate. Such coated substrates are conventionally baked in a furnace using a mixture of combustion gas and air. This process in uneconomical in terms of energy consumption and also involves cleansing of used gases before they can be discharged into the atmosphere. The present invention provides a rapid process for baking such coatings in an inert gas atmosphere by means of short-wavelength infra-red rays. Coatings are heated in such a penetrating manner than they are baked at the substrate/coating interface and this prevents the formation of swellings.

13 Claims, 3 Drawing Figures

PROCESS AND AN APPARATUS FOR BAKING AN ORGANIC COATING WHICH HAS BEEN APPLIED TO A SUBSTRATE

PRIOR ART

It is known to provide the surface of substrates, such as a metallic strip, with at least one organic coating, such as a varnish, a paint or an adhesive containing a solvent, which may be organic, to improve the aesthetic appeal and corrosion resistance thereof.

A certain number of successive operations, comprising, amongst others, baking the organic coating, are required to produce a substrate with an organic coating of this type.

Organic coatings which have been applied to a substrate are conventionally baked in a furnace, for example a convection-type furnace, using a mixture of combustion gas and air.

The air in this furnace is heated to an average temperature of about 350° C. and has to be renewed to ensure that the organic solvent concentration thereof, due to the evaporation of the organic solvents, during baking of the organic coatings, remains below the lower limit of explosiveness of the organic solvents in the air. The air in the furnace is generally renewed, so that the organic solvent content of the atmosphere of the furnace does not exceed 25% of the lower limit of explosiveness of the organic solvents in the air, this corresponding to a concentration of about 0,4% by volume of solvents. Furthermore, the gases released from the furnace have to pass into an incinerator which ensures that they are cleansed before being discharged into the atmosphere. The incineration temperature is generally about 870° C.

In terms of energy consumption, baking an organic coating which has been applied to a substrate in a convection furnace using combustion gas and air is very unfavourable. Indeed in practice, a substantial proportion of the heat is used for heating a large flow of air to a high temperature as compared with the quantity of heat actually required for heating the substrate and evaporating the organic solvents from the coating which has been applied to this substrate. It is estimated that the consumption of unproductive calories amounts to about 300% of the calorific consumption necessary for heating substrate and evaporating the solvents.

In an attempt to improve this uneconomical use of energy, a proposal was made to bake the organic coatings which have been applied to substrates, such as to a steel strip, using a hot inert gas, that is a non-oxidizing and non-reducing gas which does not form an explosive mixture with the organic solvents.

Thus, a proposal was made to bake the organic coatings using nitrogen at a temperature of about 350° C. However this known process is disadvantageous in that it demands considerable investment, and indeed, to be implemented, it demands the use of heat-exchangers which heat the nitrogen to the baking temperature in addition to the use of elongate long furnaces which are difficult to use on account of the volume thereof (drainage problem) and the inflexibility thereof (considerable thermal inertia).

A further proposal was made to bake the organic coatings which have been applied to metallic substrates in an airsweeping furnace using infra-red rays instead of using hot gases, that is a mixture of air and combustion gas or nitrogen.

However, when one considers that it is necessary to incinerate the sweeping atmosphere of the furnace, this process requires an overall energy consumption which is almost identical to that of baking in a convection furnace, reference to which was made above.

It has now been found that surprisingly good results are obtained by baking the organic coatings using infra-red rays in an inert gas atmosphere.

BRIEF DESCRIPTION OF THE INVENTION

The present invention relates to a process and to an apparatus for baking an organic coating which has been applied to a substrate, for example, a glass or metal substrate, such as a sheet of glass or a steel strip.

Thus the present invention relates to a process for baking organic coatings which have been applied to substrates, such as metal or glass substrates, characterised in that the said coatings are baked in an inert gas atmosphere using short-wavelength infra-red waves, the maximum radiance of which is at a wavelength of less than 2 microns. In an advantageous embodiment of the present invention, high-density infra-red radiation, preferably of more than 100 kilowatts per m2 are used on a face of the substrate.

Nitrogen is preferably used as the inert gas, although other non-oxidizing and non-reducing gases are also possible.

According to another characteristic of the present invention, the organic solvents collected in the inert gas atmosphere are recovered by condensing the solvents.

The present process has many advantages in comparison with the above-mentioned known processes. Thus, the present process enables the coatings to be heated in such a penetrating manner that they are baked at the interface between the coatings and the substrates, thereby preventing the formation of swellings in the coatings while ensuring an elevated baking temperature enabling the baking speed of these coatings to be considerably increased.

Furthermore, the present process is advantageous from the point of view of energy consumption and the quality of the coatings obtained.

DETAILED DESCRIPTION OF THE PROCESS ACCORDING TO THE INVENTION

The above advantages will become clearer from the following comparative tests:

In these tests, a steel sheet 0,2 mm in thickness, covered with a thin layer iron-tin alloy, that is a steel sheet of the type currently used in light metallic packing was used.

Two types of organic coatings were applied to the metal sheet, namely:

a transparent organic solvent-containing epoxy-phenol varnish which is applied at a rate from 4 to 5 grams dry per m2 (dry extract: 36% by weight);

a white acrylic paint containing an organic solvent, which is applied at a rate of from 14 to 16 grams per m2 (dry extract: 56%).

Each of the two coatings which was applied to the two sides of the steel sheets underwent rapid stoving at 280° C. and 265° C. (temperature of the metal) respectively.

In a first test, the two coatings were baked in a conventional convection furnace, the atmosphere of which was heated to a temperature of about 350° C., and it was observed that at least 0,25 kwh/m2 had to be consumed to bake the varnish and at least 0,32 kwh/m2 had to be consumed to bake the acrylic paint.

In a second test, the two coatings were baked in a furnace with an air atmosphere, in which one face of the coatings was heated by infra-red radiation with a heat flux density of 134 kw/m2, and 0,10 kwh/m2 was consumed to bake the transparent varnish as the substrate coated with this varnish advanced at a speed of 22,2 meters/minute and 0,13 kwh/m2 were consumed to bake the white paint as the sheet or strip of steel coated with this paint advanced at a speed 17,1 meters/minute. Although the energy consumption was substantially less in these baking tests using infra-red rays in an atmosphere of air, the overall energy consumption was virtually identical to that of the baking tests carried out in the convection furnace, taking into account the fact that the sweeping air of the infra-red baking furnace also had to be incinerated.

In a third attempt, the process was carried out under the same conditions as in the second test, except that the atmosphere (air) of the furnace was replaced by nitrogen. In this third test, corresponding to the present process, the same quantity of electrical energy was used as was in the second test, but the use of nitrogen instead of air in the furnace enabled a high solvent content to be obtained in the furnace which could be recovered by condensation. The calorific value which could be obtained by combusting these solvents would be 0,1737 kwh/m2 in the case of the transparent varnish and 0,2316 kwh/m2 in the case of the white acrylic paint.

Thus it can be seen that the potential energy recovered from the condensed organic solvents is greater than the electrical energy (0,10 and 0,13 kwh/m2) used for baking. This positive picture of the energy consumption of the present process is a major advantage of this process.

In comparison with processes which were hitherto known, the present process also has unexpected advantages from the point of view of the quality of the baked coatings. Thus, the present process enables baked coatings to be obtained which do not have any swellings, whereas the known baking processes in a convection furnace with an atmosphere of air or nitrogen provide coatings with swellings if baking is carried out rapidly.

Furthermore, the degree of reticulation of the coatings which were baked according to the presence process is surprisingly better than that of the coatings baked in a convection furnace under an air or nitrogen atmosphere. The degree of reticulation was determined using the so-called "Rub-Test" which consists of wiping a baked organic coating which has been applied to a substrate using a cotton wool wad which has been soaked in methylethylketone, and counting the number of wipes necessary to make the substrate appear. In the case of the above-mentioned white acrylic paint, it needed only 10 to 15 wipes after the coating of this paint had been baked for 15 minutes at 185° C., 195° C. even 205° C. under an atmosphere of air. In contrast, the number of wipes was more than 100 where, in accordance with the present invention, the coating of white acrylic paint had been baked under a nitrogen atmosphere in a furnace heated by infra-red radiation with a heat flux density of 134 kw/m2.

Thus, one can assume that, in addition to the thermal effect thereof, short-wavelength infra-red radiation has a photoreticulating effect on certain types of organic coatings.

DETAILED DESCRIPTION OF THE APPARATUS ACCORDING TO THE INVENTION

The present invention also relates to an apparatus for carrying out the present process for baking organic coatings which have been applied to a substrate, such as a glass or metal substrate, more particularly a steep strip.

The present apparatus is essentially characterised in that it comprises a substantially air-tight chamber which is provided with means for maintaining an inert gas atmosphere therein, means for displacing a substrate provided with an organic coating from an inlet, situated at one end of the chamber, to an outlet, situated at the other end of this chamber, means for circulating the inert gas in the above chamber around the substrate provided with the organic coating, short-wavelength infra-red heating means which are positioned facing the above organic coating and means for condensing the organic solvents which have evaporated from the organic coating by the said heating means.

Further information and details about the present invention will emerge from the following description, in which reference is made to the accompanying drawings which show, by way of an illustrative example which does not limit the scope of the invention, two embodiments of an apparatus to the present invention.

In these different Figures, the same reference numerals designate identical elements.

Figure 1:
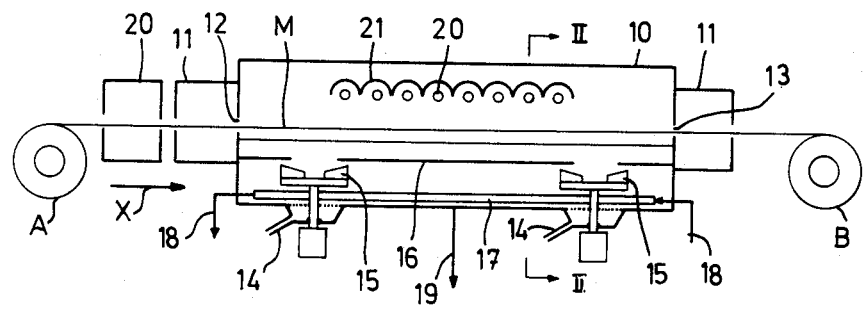
FIG. 1 shows a longitudinal section of a first embodiment of a baking apparatus according to the present invention.
Figure 2:
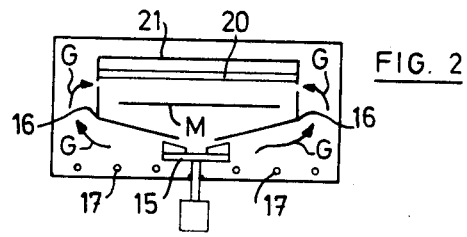
FIG. 2 shows a section along line II—II of FIG. 1.
Figure 3:
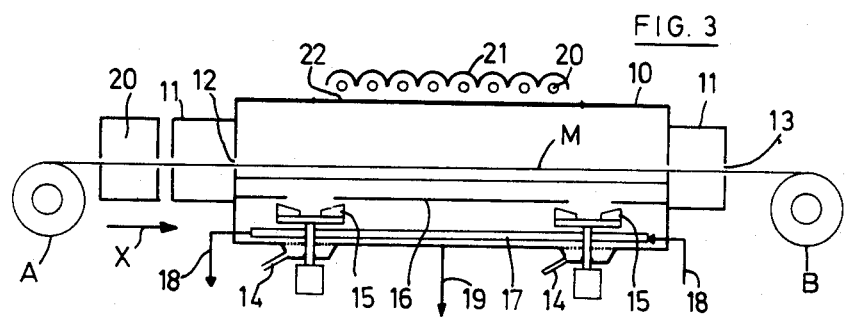
FIG. 3 shows a longitudinal section similar to that of FIG. 1 which shows a second embodiment of a baking apparatus according to the present invention.

The embodiments shown in FIGS. 1 to 3 of the baking apparatus according to the present inventions are used to bake an organic coating, such as a varnish or a paint, which has been applied to a metallic strip M.

It goes without saying that the present apparatus can be adapted to bake solvent-containing organic coating which has been applied to a glass substrate or a substrate of another material which is resistant to the baking temperature of the coating.

The metallic strip M is displaced in the direction of arrow X between roller A and roller B which are positioned outside a hermetical chamber 10 which constitutes the baking furnace. Before entering the furnace 10, the strip M passes through a station 20 where the strip is prepared and an organic coating is applied to the upper side of this strip. This station is in itself known and can be of any known type. A locking chamber 11 is provided at each end of the furnace 10 which enables the strip M to enter the furnace 10 at 12 and emerge therefrom at 13, without air being admitted.

An inert protection gas, such as nitrogen, is introduced into the furnace by at least one pipe 14. A satisfactory circulation of this inert gas around the metallic strip is ensured by the ventilators 15.

As FIG. 2 shows, in the baking furnace 10, the strip M passes into a zone surrounded by deflectors 16 which are intended to ensure that the inert gas circulates in the direction of arrows G.

At the lower part thereof, the furnace 10 is provided with condense tubes 17 in which a cooling liquid, such as water, circulates passing through a circuit indicated by reference numeral 18. The condenser tubes 17 serve to condense the solvents which have evaporated in the baking furnace 10 from the organic coating which has been applied to strip M. The condensed solvents are collected by a conduit 19.

The baking of the coating of strip M is ensured by an infra-red heating device comprising radiants 20 provided with reflectors 21.

In the embodiment of the present apparatus shown in FIGS. 1 and 2, the infra-red heating device is mounted inside the furnace 10 above the path taken by the strip M. In contrast, in the embodiment shown in FIG. 3, this heating device is mounted outside the furnace 10, above an upper wall 22 of a material which is permeable to infra-red rays, such as quartz. It is advantageous to mount the infra-red heating device outside the furnace 10, as shown in FIG. 3, as this permits ease of repairing and servicing the sources of infra-red rays 20. Moreover, there is no risk of a deposit of carbon forming on the radiants 20 and the reflectors 21.

Instead of being formed by condenser tubes 17 mounted in the furnace 10, a device for condensing the solvents which have evaporated can be provided outside the furnace 10, the inert gas which is charged with vapours from the solvents being passed through the ventilators 15 into the condensation device.

We claim:

1. A process for treating an organic coating of paint, ink or varnish applied to a substrate consisting of polymers dispersed in a solvent, said process comprising the steps of:
    radiating in a heating furnace said organic coating with short-wavelength infra-red rays in an inert gas atmosphere without acting chemically on the polymers contained therein to evaporatively remove the organic solvent from the coating, and
    condensing the removed organic solvent such that air is prevented from being introduced into the heating furnace to prevent explosions by air/solvent mixture, and to increase the evaporation content of the atmosphere of the heating furnace to thereby increase the rate of solvent removal from the coating, and reduce the cost of subsequent solvent condensation.

2. The process according to claim 1, wherein infra-red radiation having a maximum radiations wavelength of less than about 2 microns is used.

3. The process according to claim 1, wherein high-density infra-red radiation is used, said radiation having a heat flux density of more than about 100 kilowatts per $m^2$ on a face of the substrate.

4. The process according to claim 1, wherein the inert gas atmosphere consists of nitrogen.

5. The process according to claim 1, wherein said substrate is selected from the group consisting of metallic strips and glass sheets.

6. The process according to claim 1, wherein said coating is selected from the group consisting of varnishes, paints and adhesives containing organic solvents.

7. An apparatus for treating an organic coating which contains at least one organic solvent and which has been applied to a substrate, said apparatus comprising:
    a chamber which is substantially air tight;
    means associated with said chamber for maintaining an inert gas atmosphere therein;
    means for displacing a substrate provided with an organic coating from an inlet, situated at a first end of said chamber, to an outlet, situated at a second end of said chamber;
    means for circulating said inert gas in said chamber around said substrate;
    short-wavelength infra-red baking means arranged to face said organic coating on said substrate when said substrate is displaced in said chamber in order to bake said coating and remove the organic solvent(s) therefrom; and
    means for condensing organic solvent(s) which have evaporated from said organic coating under baking by said heating means.

8. The apparatus according to claim 7, wherein said means for circulating said inert gas around said substrate comprises deflectors which extend on either side of the path of the substrate and a ventilator which is provided near each end of the deflectors.

9. The apparatus according to claim 7, wherein said means for condensing the solvents comprises a heat exchanger mounted in a lower part of said chamber.

10. The apparatus according to claim 7, wherein said means for condensing said solvents is mounted outside said chamber.

11. The apparatus according to claim 7, wherein said infra-red baking means is mounted in said chamber.

12. The apparatus according to claim 7, wherein said infra-red baking means is mounted outside said chamber facing a wall of said chamber which is permeable to infra-red rays.

13. The apparatus according to claim 7, wherein said infra-red baking means comprises radiants and reflectors.

* * * * *